United States Patent [19]

Kenny et al.

[11] Patent Number: 4,651,020
[45] Date of Patent: Mar. 17, 1987

[54] REDUNDANT POWER SUPPLY SYSTEM

[75] Inventors: Thomas J. Kenny, Pittsburgh; Carl A. Vitalbo, Plum Boro, both of Pa.

[73] Assignee: Westinghouse Electric Corp., Pittsburgh, Pa.

[21] Appl. No.: 774,496

[22] Filed: Sep. 10, 1985

[51] Int. Cl.$^4$ ................................................ H02J 1/04
[52] U.S. Cl. ...................................... 307/43; 307/44; 307/64; 307/86
[58] Field of Search .................... 307/43, 44, 65, 66, 307/64, 48, 85, 80, 86, 87

[56] References Cited

U.S. PATENT DOCUMENTS

| | | | |
|---|---|---|---|
| 3,641,570 | 2/1972 | Thompson | 307/65 X |
| 3,912,940 | 10/1975 | Vince | 307/64 |
| 3,974,397 | 8/1976 | Killough, Jr. | 307/43 X |
| 4,315,162 | 2/1982 | Ferguson | 307/66 |
| 4,476,399 | 10/1984 | Yoshida et al. | 307/65 X |

OTHER PUBLICATIONS

PowerSystems by Powertec "The Proven Solution to Your Total System Power Requirements" (Brochure) Nov. 1984.

Primary Examiner—William M. Shoop, Jr.
Assistant Examiner—Sharon D. Logan
Attorney, Agent, or Firm—R. S. Lombard

[57] ABSTRACT

A redundant power supply for digital control systems, such as one using a MULTI-BUS backplane which utilizes remote sensing power supplies and level holding capacitors to provide continuous operation when one of the power supplies fails. Embodiments of the invention include a dual redundant power supply system for a backplane having a pair of power buses which provide positive five volts, positive twelve volts and negative twelve volts with reference to ground. Equipment drawing relatively high currents, e.g., 40 amperes, can be continuously supplied with power at a voltage regulated to within ±0.1% of nominal values for each 10% change in current.

13 Claims, 7 Drawing Figures

REDUNDANT POWER SUPPLY SYSTEM

BACKGROUND OF THE INVENTION

1. Field of the Invention

The present invention relates in general to regulated direct current (DC) power supplies; and more particularly, to redundant DC power supplies for a MULTI-BUS digital system with relatively large current requirements.

2. Description of the Related Art

Many applications of electrical control systems require a high degree of reliability. For example, whenever an electrical control system is operating in a hostile environment, such as in a nuclear power system or in outer space, the reliability of the control system is of paramount importance. One method of increasing reliability is to provide some type of redundancy. Even in less critical applications, redundant components are often used to provide uninterrupted service.

One of the weakest components in many control systems which utilize solid-state devices, is the power supply for the system. There have been a variety of attempts to increase the reliability of power supplies by utilizing redundant components. However, no known design is capable of providing a well regulated voltage, e.g., ±0.1% change in voltage for a 10% change in a relatively large current, e.g., 30 or 40 amperes, without utilizing a complex control circuit which reduces the inherent reliability of the power supply system having redundant power supplies. For example, when relatively large currents are drawn from a power supply system, by a control system having relatively long wiring lengths, e.g., in an industrial plant process control system or a nuclear power generation system, remote sensing of the voltage as close as possible to the load makes it possible to provide better voltage regulation than when local sensing of the voltage output by the power supply system is used. However, most known redundant power supply systems do not allow for remote sensing.

Examples of prior art attempts to improve reliability include U.S. Pat. No. 4,075,502 to Walley, Jr. which utilizes a complex control circuit to select one of two DC power supplies as providing a voltage which is closer to the preset standards. Thus, the redundant power supply system taught by Walley, Jr. adds an additional unit, the control circuit, which can fail; thus reducing the inherent reliability gained by utilizing redundant power supplies. Similarly, a power supply system taught by U.S. Pat. No. 4,096,394 to Ullmann et al. utilizes active elements to provide switching from one power supply to another. The system taught by Ullmann et al. also uses an energy store which maintains the voltage supplied to the load during switching from one power supply to the other; thus, improving the ability of the power supply system to provide continuous operation at close to the desired voltage level. However, the system taught by Ullmann et al. is directed to a diesel generator backup for an alternating current (AC) system, not a low voltage, high current direct current (DC) system.

Another redundant power supply system which utilizes active switching equivalents is disclosed in U.S. Pat. No. 3,912,940 to Vince which eliminates the need for the additional energy store while still providing continuous operation. The power supply system disclosed in Vince is capable of maintaining the voltage at close to a preset level when the active power supply fails by keeping the stand-by power supply on at all times with a reduced output. When the active power supply fails, the stand-by power supply is turned fully on. In addition to the reliance on active switching elements, i.e., transistors, the power supply system in Vince does not address the specific requirements of a low voltage, high current system.

Other power supply systems, similar to that taught by Vince, are available from Powertec, Inc. The Powertec PS4001 is fully load-sharing, that is, there is no "stand-by" power supply, rather both power supplies provide power simultaneously. However, the PS4001 power supply is not remote sensing and as a result the voltage is not regulated as well as possible.

The Powertec 29D series adds remote sense capability and "unlimited" expansion to the features of the PS4001. However, complex circuitry is required to provide the additional features with a resulting increased possibility of failure, as discussed above. In addition the 29D series power supplies are not easy to install separately for maintenance concurrent with operation of the MULTI-BUS system.

A power supply system which does not require the operation of active switching elements to maintain the voltage level during switching from one power supply to another is disclosed in U.S. Pat. No. 3,641,570 to Thompson. The system taught by Thompson utilizes a filter capacitor which minimizes fluctuations on the positive power bus. However, the power supply system disclosed in Thompson does not utilize remote sensing or provide a regulated voltage by any other means.

SUMMARY OF THE INVENTION

An object of the present invention is to provide a redundant power supply system which utilizes remote sensing power supplies and a passive control system which continuously maintains the voltage supplied to a load at substantially a preset level.

Another object of the present invention is to provide a redundant power supply system which supplies relatively large currents at a relatively low voltage and utilizes remote sensing.

A further object of the present invention is to provide a redundant, remote sensing power supply system which includes connections for indicating the actual voltage output by the power supplies.

The above objects are provided by a redundant power supply system for supplying electrical power to a load, such as primary and secondary power supply buses, the redundant power supply system including first and second power supplies for supplying power to the load. The first and second power supplies have respective first and second reference voltage levels which are compared to a voltage across the load so that only one of the first and second power supplies supply power to the load at any one time. The redundant power supply system also includes first and second remote sensors for sensing the voltage across the load, first and second unidirectional current devices for controlling current flow between the load and the first and second power supplies, respectively, and an energy storage device for maintaining the voltage across the load at substantially the second reference voltage level when switching between said first and second power supplies.

One embodiment of the present invention also includes indicators for indicating which of the first and second power supplies is supplying power to the load. In another embodiment of the present invention, each of the power supplies includes primary, positive secondary and negative secondary power outputs for supplying power to the primary and secondary power supply buses. In this embodiment, the primary power output maintains a primary voltage carried by the primary power supply bus at one of the first and second reference voltages.

These objects, together with other objects and advantages will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
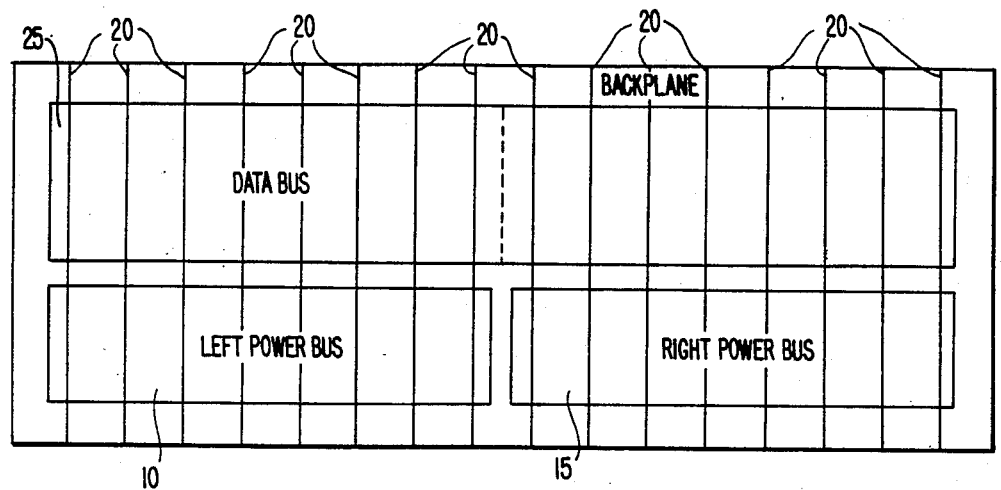
FIG. 1 is a block diagram of a MULTI-BUS backplane.

In digital control systems having relatively large current requirements, such as those found in many industrial plants and nuclear power systems, some type of bus structure is commonly used to provide power to the electronic components from individual power supplies. One such structure is the IEEE-796 standard which is commercially available as a MULTI-BUS backplane from INTEL. MULTI-BUS backplanes are available for many different current requirements. An example of a MULTI-BUS backplane which includes left 10 and right 15 power buses is illustrated in FIG. 1. Each of the left 10 and right 15 buses provides power for eight of the sixteen slots 20 which accept circuit boards with MULTI-BUS edge connectors. All of the slots may be connected to a single data bus 25 or the data bus 25 may be separated into left and right data buses as indicated by the dashed line.

Figure 2A:
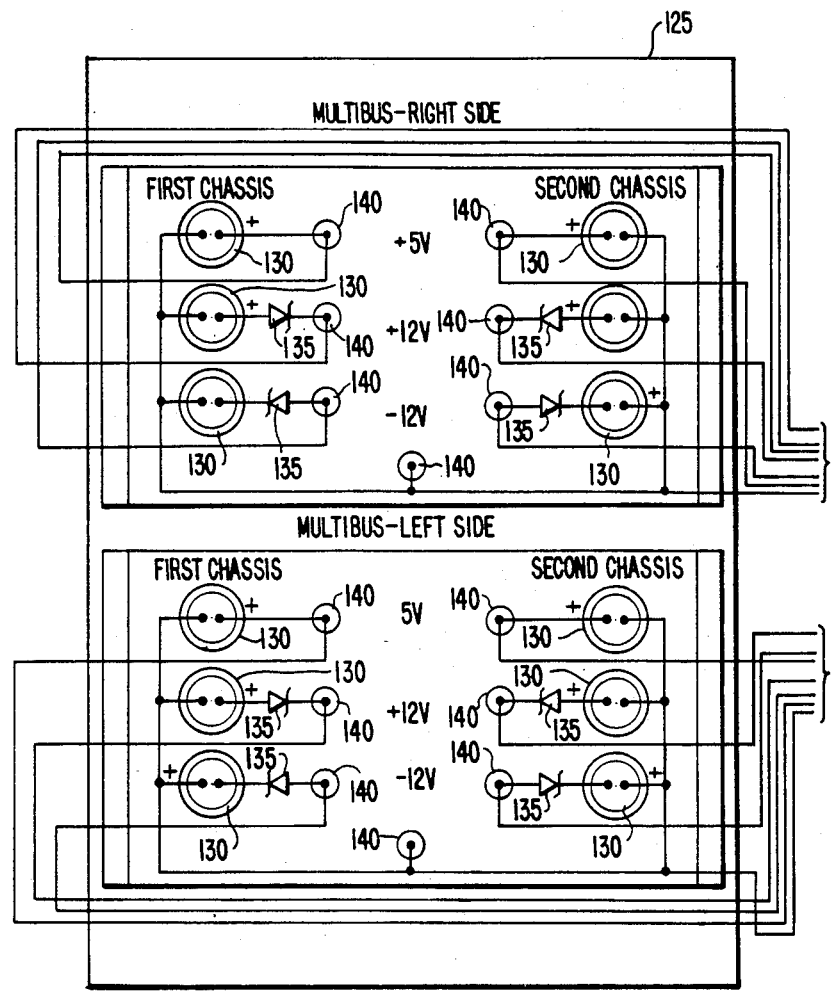
FIGS. 2A through 2C are a block diagram of an embodiment of the present invention.
Figure 2B:
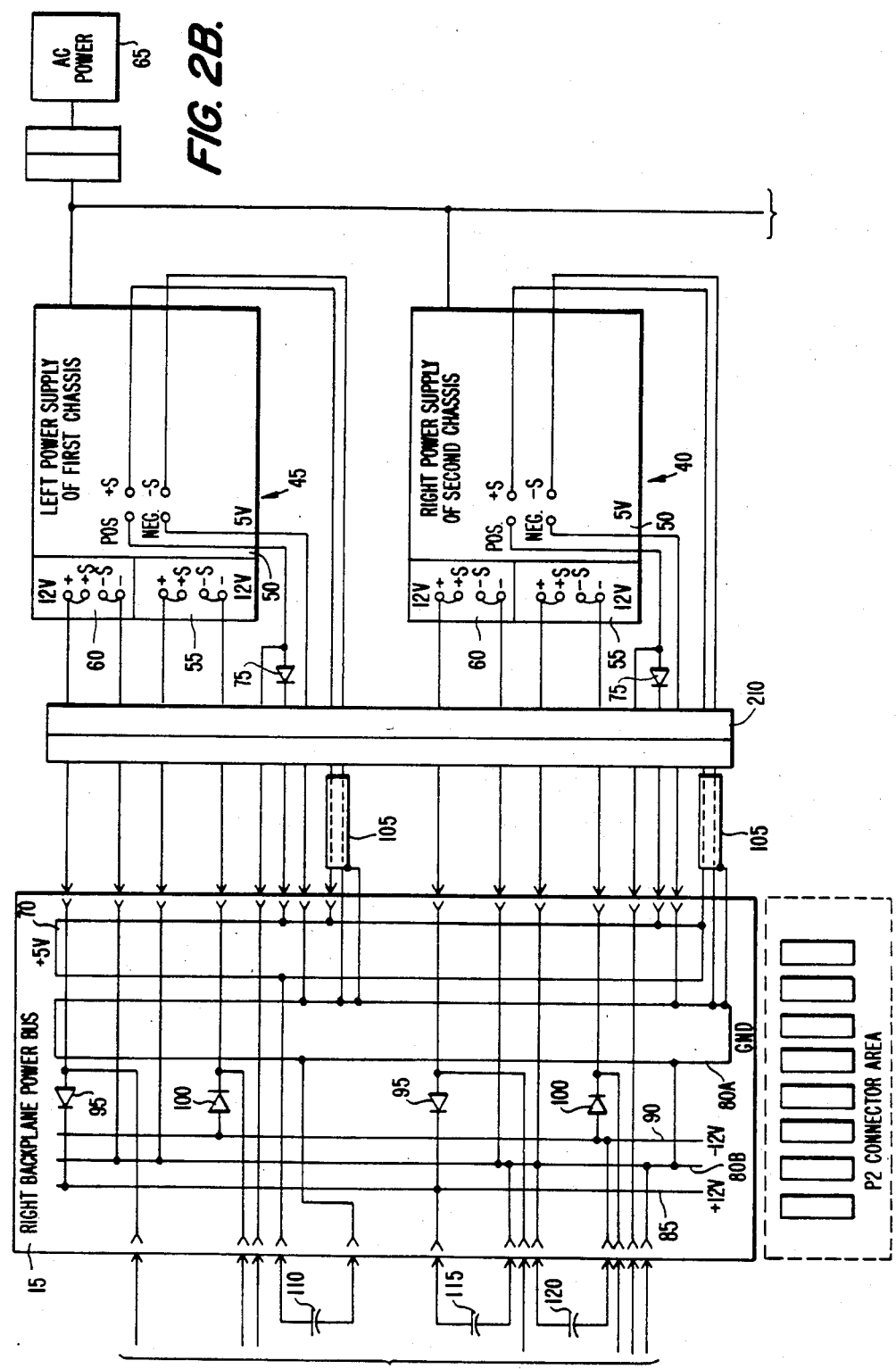
Figure 2C:
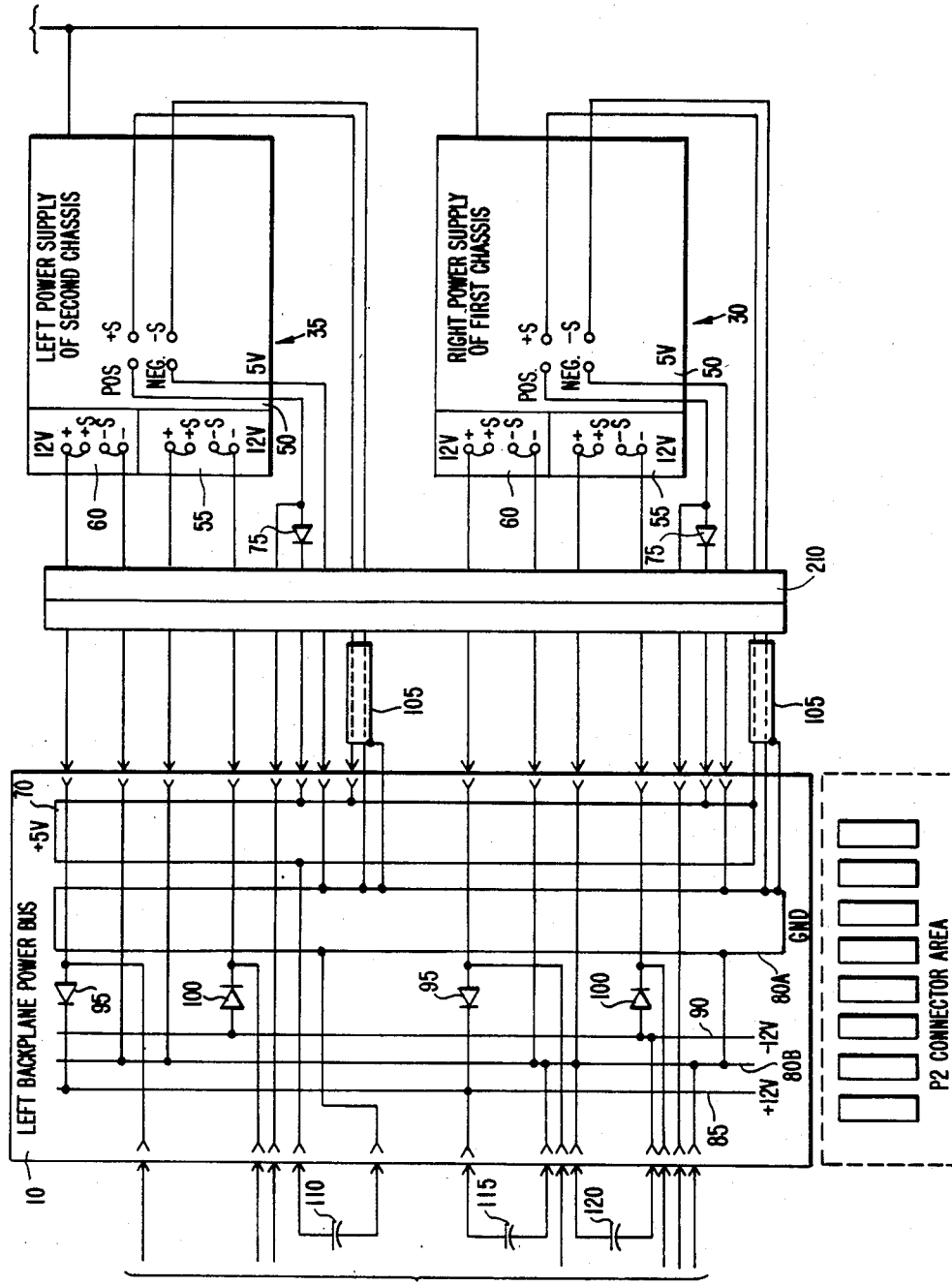

Two power buses 10 and 15 are used in the backplane illustrated in FIG. 1 due to the large current requirements of the circuits which are connected to the backplane. Each of the power buses 10 and 15 must be connected to different power supplies. Thus, the embodiment illustrated in FIG. 2 is a dual redundant power supply system. However, the present invention may be practiced on a single redundant power supply system for a control system having lower current requirements. In this case, the redundant power supplies would be connected in parallel to a single power supply bus.

In the embodiment of FIG. 2, each of the left 10 and right 15 backplanes are connected to two power supplies 30 and 35 or 40 and 45. Each of the power supplies may be an RT 301-118 available from ACDC Electronics, which has one five volt DC output 50 and two twelve volt DC outputs 55 and 60. The power supplies 30-45 each receive AC power in a conventional manner from an AC power source represented by power distribution box 65. Each of the outputs 50, 55 and 60 are regulated to maintain the voltage input to sense terminals S to within $\pm 5\%$. Thus, the sense terminals S may be used to perform remote sensing, as illustrated in the five volt outputs 50, or local sensing, as illustrated in the twelve volt outputs 55 and 60.

Each of the power buses 10 and 15 include a positive five volt power bus 70 which is connected to the positive five volt output 50 of two of the power supplies 30-45 via auctioneering diodes 75. Preferably, the auctioneering diodes 75 connected to the positive terminal POS of the five volt output 50 are Schottky barrier diodes, such as an MBR6035 manufactured by Motorola, to minimize the voltage drop across the diodes 75. The negative terminal NEG of the five volt output 50 is connected to a ground bus 80 which is illustrated as two ground buses 80A and 80B connected together.

Positive 85 and negative 90 twelve volt power buses in the backplanes 10 and 15 are connected to the twelve volt outputs 55 and 60 of the power supplies 30-45 as follows. The positive terminal "+" of one of the twelve volt outputs, e.g., 60, is connected to the positive twelve volt power bus 85 via auctioneering diode 95, such as a 1N5821, available from Motorola. The negative twelve volt power bus 90 is connected to the negative terminal "−" of the other twelve volt output, e.g., 55, via a similar auctioneering diode 100. The negative terminal "−" of the first twelve volt output 60 and the positive terminal "+" of the second twelve volt output 55 are both connected to the ground bus 80B; thus, providing positive and negative twelve volts on power buses 85 and 90, respectively.

The remote sense terminals +S and −S of the five volt output 50 in each of the power supplies 30-45 are connected to the positive five volt power bus 70 and ground bus 80A via shielded low-loss cables 105 to provide remote sensing capability. The power supplies 30-45 are preferably designed to output up to one volt above the voltage received by the sense terminals +S and −S to maintain the received voltage at a preset reference voltage despite the drop in voltage caused by the connecting wires and diodes 75, 95 and 100. Each power supply connected to one of the power buses 10 or 15 is preset with a slightly different reference voltage so that, for example, only one of power supplies 30 and 35 will supply power to the positive five volt power bus 70 at any one time, since the other power supply will receive a voltage at its sense terminals +S and −S which is higher than the reference voltage preset therein. The auctioneering diodes 75, 95 and 100 prevent the nonoperative power supply from providing a load on the operative power supply.

Figure 3:
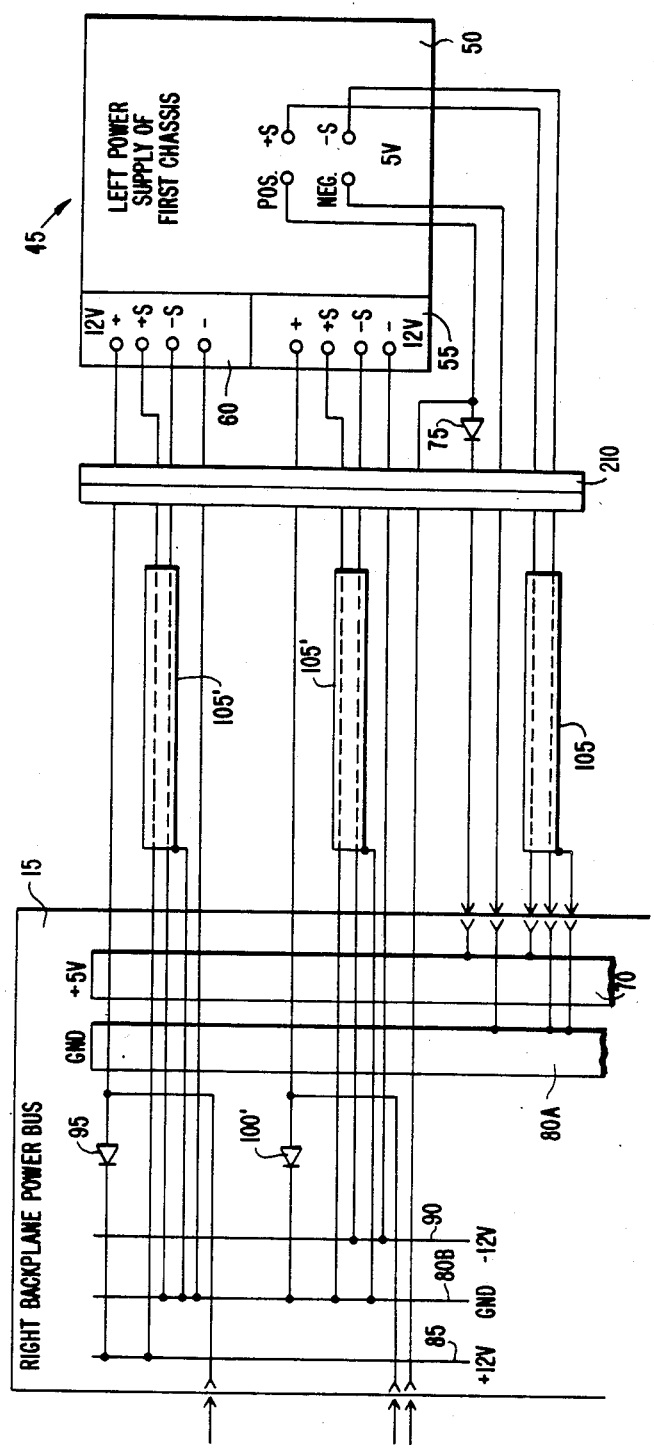
FIG. 3 is a block diagram depicting connections between a MULTI-BUS backplane and one of the power supplies in another embodiment of the present invention.

In the embodiment of FIG. 2, the twelve volt outputs 55 and 60 are independently regulated from the five volt output 50, but output power only when the five volt output 50 in that power supply is operative. For example, the RT 301-118 utilizes a switching power supply to provide the five volt output 50 while the two twelve volt outputs 55 and 60 are provided by linear transformers using the five volt switching power supply. Therefore, when the five volt output 50 is nonoperative, the twelve volt outputs 55 and 60 for that power supply are also nonoperative. This is acceptable where the twelve volt outputs 55 and 60 have a longer expected life at full power and are generating a smaller fraction of their rated current than the five volt output 50. When this is not the case, it is possible to practice the present invention using independent twelve volt power supplies in place of the twelve volt outputs 55 and 60 by changing the connections of diode 100 and utilizing low loss cabling 105' to provide remote sensing, as illustrated in FIG. 3.

A power supply system according to the present invention is capable of continuous operation, even if one of the power supplies 30–45 fails, due the inclusion of capacitors 110–120 connected to the ground bus 80 and the positive five volt 70, positive twelve volt 85 and negative twelve volt 90 power buses, respectively, in one of the left 10 and right 15 backplanes. Capacitor values of 490 mF for capacitor 110 connected to the positive five volt power bus 70 and 17 mF for capacitors 115 and 120 connected to the positive 85 and negative 90 twelve volt power buses are sufficient to prevent significant loss of voltage on the power buses 70, 85 and 90 during the time, e.g., 700–1000 μsec, required for the nonoperative or stand-by power supplies to turn on and begin supplying power.

The embodiment illustrated in FIG. 2 includes an indicator board 125 on which lamps 130 indicate the operation of each of the outputs 50, 55 and 60 in each of the power supplies 30–45. If five volt lamps are used throughout as the indicator lamps 130, zener diodes 135 can be connected as illustrated to reduce the voltage received from the positive 60 and negative 55 twelve volt outputs. The indicator board 125 also includes test jacks 140 which are connected to the positive terminal POS of the positive five volt output 50, the positive terminal "+" of one of the twelve volt outputs 60 and the negative "−" terminal of the other twelve volt output 55 in each of the power supplies 30–45 in addition to the ground bus 80 of each of the backplanes 10 and 15. While it is possible to replace the lamps 130 with meters, the preferred embodiment illustrated in FIG. 2 utilizes the test jacks 140 to permit accurate measurements of the actual output of the operating power supplies, since precise measurements are only occasionally necessary.

Figure 4:
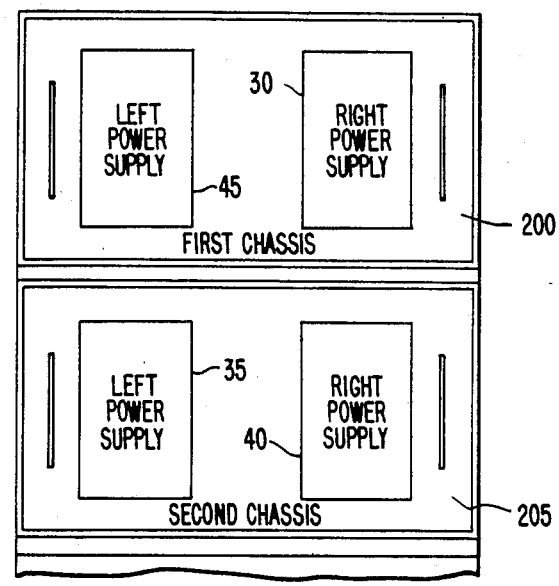
FIG. 4 is a front view of a rack holding power supplies used in an embodiment of the present invention.

One of the advantages of the simple structure of the present invention is that the power supplies 30–45 for each backplane 10 and 15 can be mounted in different chassis 200 and 205, as illustrated in FIG. 4. Since power supplies 30 and 35 provide power to the left backplane 10, if after a period of time the active power supply, e.g., power supply 30, fails, power supply 35 will turn on and begin supplying power to the left backplane 10 as described above. If the power supply arrangement illustrated in FIG. 4 is used, the first chassis 200 may be removed for maintenance or replacement of the right power supply 30 while power supply 35 provides power to the left backplane 10 and power supply 40 provides power to the right backplane 15.

Figure 5:
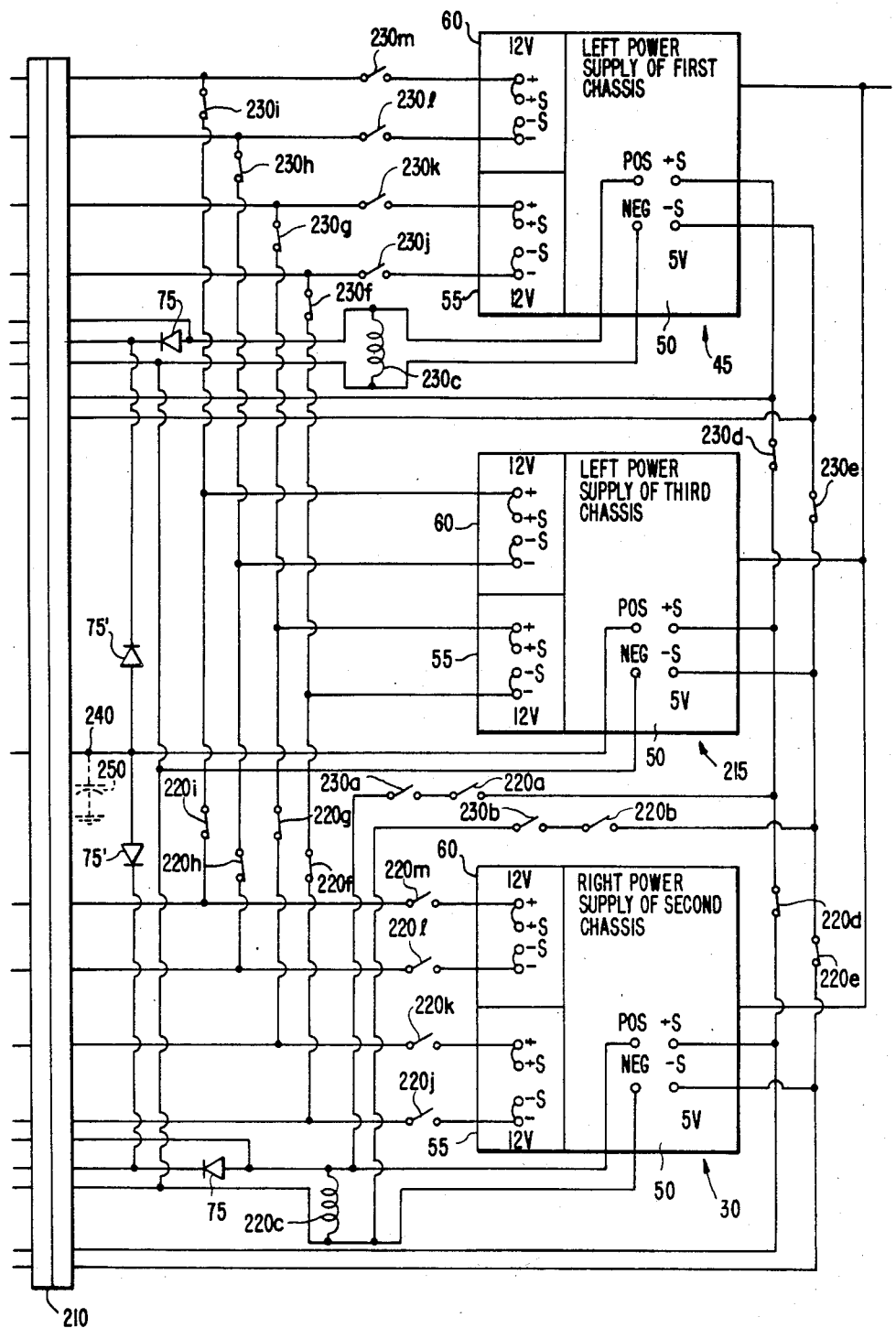
FIG. 5 is a second embodiment of the present invention.

Another embodiment of the present invention is illustrated in FIG. 5. In this embodiment, power supplies 30 and 45 are connected to the left and right backplanes 10 and 15, respectively, to the left of the connector 210 (see FIGS. 2B and 2C). However, instead of each of the power supplies 30 and 45 being connected in parallel with a separate power supply 35 or 40, respectively, as in the embodiment illustrated in FIG. 5, a single power supply 215 backs up both power supplies 30 and 45. As indicated, power supply 215 is preferrably not in the same chassis as either power supply 30 or 45. This is easily accomplished if a third DC voltage, such as 15 volts, is used in the same system. The DC power supplies which output 15 volts can be mixed with power supplies 30, 45 and 215 in place of power supplies 30 and 35 in FIG. 4.

Power supply 215 is able to backup either power supply 30 or power supply 45 due to the addition of current switching devices such as relays 220 and 230. Relay coils 220c and 230c control the switching of current and are activated when power supplies 30 and 45, respectively, are operating. As a result, normally open relay contacts 220a, 220b, 220j–220m, 230a, 230b and 230j–230m are closed due to the energization of relay coils 220d and 230d. Simultaneously, normally closed relay contacts 220d–220i and 230d–230i are opened due to the energization of relay coils 220c and 230c. These relay coils and contacts can be provided by four (4) relays of the four pull, double throw (4 form C contact) type, such as Potter & Brumfield's T60S17D11. Using such relays, each of the coils 220c and 230c would represent two physical coils.

Therefore, during normal operation, when both power supplies 30 and 45 are operating, the sense terminals +S and −S of the 5 volt output 50 in power supply 215 are connected via relay contacts 220a, 220b, and 230a and 230b to the 5 volt output of power supply 30 (ahead of auctioneering diode 75). Thus, power supply 215 will not output any current since its sense terminals +S and −S receive significantly more than 5 volts.

When a failure occurs in one of the power supplies 30 or 45, e.g., power supply 45, the associated relay coil, e.g., 230c is de-energized and the associated relay contacts, e.g., 230a, 230b and 230d–m, assume their normal state. Thus, relay contacts 230a, 230b and 230j–230m will open, cutting off the supply of current from power supply 30 to the sense terminals +S and −S of power supply 215 and the flow of power from the 12 volt outputs 55 and 60 of the power supply 40 to the right backplane power bus. Simultaneously, the normally closed relay contacts 230d and 230e will close, so that the sense terminals +S and −S for the 5 volt output 50 of power supply 215 will be connected to the 5 volt remote sensing lines of power supply 45 which are connected to the right backplane power bus 15. In addition, normally closed relay contacts 230f–230i will also close, connecting the 12 volt outputs 55 and 60 of power supply 215 to the right backplane power bus 15.

In this embodiment, auctioneering diodes 75' are supplied between the positive 5 volt output 50 of power supply 215 and the cathodes of the auctioneering diodes 75 connected to power supplies 30 and 45. Thus, only a single status indicating line 240 is connected to the indicator board 125 to indicate the status of power supply 215. Therefore, when power supply 215 is operating, the indicator lamps 130 of the inoperative power supply, e.g., power supply 45, would indicate the status of the 12 volt outputs 55 and 60 of power supply 215. If desired, additional status indicating lines 240 could be provided for the 12 volt outputs 55 and 60 of power supply 215. Similarly, if the auctioneering diodes 95 and 100 for the 12 volt outputs 55 and 60 of power supplies 30 and 45 were moved from the backplane power buses 10 and 15 to the power supply side of connector 210 (replacing normally open contacts 220j–220m and 230j–230m), normally closed relay contacts 220f–220i and 230f–230i could be replaced with auctioneering diodes connected in a manner similar to auctioneering diodes 75' with appropriate polarity observed.

Depending on the speed with which the backup power supply 215 becomes operative, a level holding capacitor 250 may need to be connected to the positive terminal POS of the 5 volt output 50 for power supply 215. A typical value for such a capacitor is 100,000 $\mu$F.

The many features and advantages of the present invention are apparent from the detailed specification, and thus it is intended by the appended claims to cover all such features and advantages of the redundant power supply system which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. A redundant power supply system for supplying electrical power to a load having a voltage thereacross, comprising:
    first and second power supply means, operatively connectable in parallel across the load, for supplying power to the load, said first and second power supply means having first and second reference voltage levels, respectively, the first reference voltage level being slightly greater than the second reference voltage level, said first and second power supply means supplying power only when the voltage across the load is less than or equal to the first and second reference voltage levels, respectively;
    first and second remote sensing means, operatively connectable to the load and operatively connected to said first and second power supply means, respectively, for sensing the voltage across the load;
    first and second unidirectional current means, operatively connectable to the load and operatively connected to said first and second power supply means, for controlling current flow between the load and said first and second power supply means, respectively; and
    energy storage means, operatively connectable in parallel with the load, for maintaining the voltage across the load at substantially the second voltage level when switching between said first and second power supply means.

2. A redundant power supply system as recited in claim 1,
    wherein said first and second unidirectional current means are connected to said first and second power supply means at first and second junctions, respectively,
    wherein said first and second power supply means are operatively connected in common to ground, and
    wherein said redundant power supply system further comprises:
        first and second test jacks operatively connected to the first and second junctions; and
        a third test jack operatively connected to ground.

3. A redundant power supply system as recited in claim 2, further comprising indicator means, operatively connected to the first and second junctions and ground, for indicating which of said first and second power supply means is supplying power to the load.

4. A redundant power supply means as recited in claim 1,
    wherein the load includes primary and secondary loads, and
    wherein each of said first and second power supply means comprises:
        primary regulated power output means for supplying power to the primary load at one of the first and second reference voltage levels, respectively; and
        a pair of secondary regulated power output means, each for supplying power to the secondary load at substantially a third reference power level, one of said secondary regulated power output means supplying a positive voltage and the other of said secondary regulated power output means supplying a negative voltage.

5. A redundant power supply system for supplying electrical power to a primary power bus having a first current rating and a secondary power bus having a second current rating lower than the first current rating, said system comprising:
    first and second power supply means for supplying power to the primary and secondary power buses, the primary power bus receiving power at a primary voltage level from one of said first and second power supply means, said first and second power supply means each comprising:
        primary power output means for supplying power to maintain the primary voltage level at one of first and second reference voltage levels corresponding to said first and second power supply means, the first reference voltage level being slightly greater than the second reference voltage level;
        positive secondary power output means for supplying power to the secondary power bus at a secondary voltage level with positive polarity; and
        negative secondary power output means for supplying power to the secondary power bus at the secondary voltage level with negative polarity;
    first and second remote sensing means, operatively connected to the primary power bus and said primary power output of said first and second power supply means, respectively, for sensing the primary voltage level;
    unidirectional current means for controlling electrical flow between the primary and secondary power buses and said primary and positive and negative secondary power output means in each of said first and second power supply means; and
    energy storage means, operatively connected to the first and second power buses, for maintaining the primary and secondary voltage levels when the one of said first and second power supply means which supplies power to the primary and secondary power buses is changed.

6. A redundant power supply as recited in claim 5,
    wherein the secondary power bus carries power at positive and negative secondary voltages, and
    wherein said redundant power supply system further comprises first and second positive and first and second negative secondary remote sensing means, operatively connected to the secondary power bus, and to said positive secondary power output means in said first and second power supply means and said negative secondary power output means in said first and second power supply means, respectively, for sensing the positive and negative secondary voltages.

7. A dual redundant electrical power supply system for a MULTI-BUS backplane having left and right positive five volt power buses, left and right positive twelve volt power buses, left and right negative twelve volt power buses, and left and right ground buses, the left and right positive five volt power buses having a first current rating and the left and right positive and negative twelve volt power buses having a second current rating lower than the first current rating, said system comprising:

first and second left and first and second right power supplies for supplying power to the left and right power buses, respectively, one of said first and second left power supplies supplying power to the left power buses and one of said first and second right power supplies supplying power to the right power buses, each of said first and second left and first and second right power supplies comprising:

five volt output means for maintaining a corresponding one of the left and right positive five volt power buses at substantially positive five volts;

positive twelve volt output means for supplying power to a corresponding one of the left and right positive twelve volt power buses; and negative twelve volt output means for supplying power to a corresponding one of the left and right negative twelve volt power buses;

connection means for connecting said five volt and positive and negative twelve volt output means to the corresponding ones of the left and right positive five volt and positive and negative twelve volt power buses, each of said connection means having a voltage drop thereacross and each including a diode, the power output by said positive and negative twelve volt output means having a magnitude greater than twelve volts by the voltage drop across said connection means connected thereto;

first and second left and first and second right remote sensing means, operatively connected to said positive five volt output means in said first and second left and first and second right power supplies and operatively connectable to the left and right positive five volt power buses, for sensing the voltage carried by the left and right positive five volt power buses, respectively;

capacitors operatively connectable to each of the left and right positive five volt, left and right positive twelve volt and left and right negative twelve volt power buses and to the left and right ground buses; and test/indicator means, each operatively connected at one end to one of said first and second left and first and second right five volt, positive twelve volt and negative twelve volt output means and the diode in said connection means connected thereto, and operatively connectable at another end to one of the left and right ground buses, for indicating the power output by said first and second left and first and second right five volt, positive twelve volt and negative twelve volt output means.

8. A redundant power supply system for supplying electrical power to first and second loads having first and second voltages, respectively, thereacross, said redundant power supply system comprising:

first and second power supply means for supplying power to the first and second loads, respectively;

first and second remote sensing means, operatively connectable to the first and second loads and operatively connected to said first and second power supply means, for sensing the first and second voltages across the first and second loads, respectively;

third power supply means, operatively connected to said first and second power supply means and said first and second remote sensing means, for supplying power to one of the first and second loads when a corresponding one of said first and second power supply means fails;

first and second current switching means, operatively connectable to the first and second loads and operatively connected to said first and second power supply means and said first and second remote sensing means, respectively, and to said third power supply means, for controlling current flow between said first, second and third power supply means and the first and second loads; and first and second energy storage means, operatively connectable in parallel with the first and second loads, for maintaining the first and second voltages across the first and second loads, respectively, when said third power supply means begins supplying power to the one of the first and second loads.

9. A redundant power supply system as recited in claim 8, wherein said first and second current switching means each comprises:

switching control means, operatively connected to the corresponding one of said first and second power supply means, for providing current switching control;

power control means, operatively connected to one of said first and second power supplies and to said third power supply, for causing the third power supply to supply power to the one of the first and second loads in response to the current switching control, when the corresponding one of said first and second power supply means fails;

remote sensing control means, operatively connected to a corresponding one of said first and second remote sensing means and said third power supply means, for connecting said third power supply means to the corresponding one of said first and second remote sensing means in response to the current switching control; and output control means operatively connectable to the one of the first and second loads and operatively connected to the corresponding one of said first and second power supply means and said third power supply means, for supplying power from one of said third power supply means and the corresponding one said first and second power supply means in response to the current switching control.

10. A redundant power supply system as recited in claim 8, wherein said switching control means comprises a relay coil operatively connected to the corresponding one of said first and second power supply means, wherein said power control means comprises a first normally open relay contact, operatively connected between one of said first and second power supply means and said third power supply means, responding to the current switching control by opening when the corresponding one of said first and second power supply means fails, wherein said remote sensing control means, comprises a first normally closed relay contact, operatively connected to the corresponding one of said first and second remote sensing means and said third power supply means, responding to the current switching control by closing when the corresponding one of said first and second power supply means fails, and wherein said output control means comprises:
- a second normally open relay contact, operatively connectable to the one of the first and second loads and the corresponding one of said first and second power supply means, responding to the current switching control by opening when the corresponding one of said first and second power supply means fails; and
- a second normally closed relay contact, operatively connectable to the one of the first and second loads and operatively connected to said third power supply means, responding to the current switching control by closing when the corresponding one of said first and second power supply means fails.

11. A redundant power supply system as recited in claim 8, wherein said switching control means comprises a relay coil operatively connected to the corresponding one of said first and second power supply means, wherein said power control means comprises a normally open relay contact, operatively connected between one of said first and second power supply means and said third power supply means, responding to the current switching control by opening when the corresponding one of said first and second power supply means fails, wherein said remote sensing control means, comprises a normally closed relay contact, operatively connected to the corresponding one of said first and second remote sensing means and said third power supply means, responding to the current switching control by closing when the corresponding one of said first and second power supply means fails, and wherein said output control means comprises:
- a first diode operatively connectable to the one of the first and second loads and operatively connected to the corresponding one of said first and second power supply means; and
- a second diode operatively connectable to the one of the first and second loads and operatively connected to said first diode and said third power supply means.

12. A dual redundant electrical power supply system for a MULTI-BUS backplane having left and right positive five volt power buses, left and right positive twelve volt power buses, left and right negative twelve volt power buses, and left and right ground buses, the left and right positive five volt power buses having a first current rating and the left and right positive and negative twelve volt power buses having a second current rating lower than the first current rating, said system comprising:

left and right power supplies for supplying power to the left and right power buses, respectively, each of said left and right power supplies comprising:
- five volt output means for maintaining a corresponding one of the left and right positive five volt power buses at substantially positive five volts;
- positive twelve volt output means for supplying power to a corresponding one of the left and right positive twelve volt power buses; and
- negative twelve volt output means for supplying power to a corresponding one of the left and right negative twelve volt power buses;

connection means for connecting said five volt and positive and negative twelve volt output means to the corresponding ones of the left and right positive five volt and positive and negative twelve volt power buses, each of said connection means having a voltage drop thereacross and each including a diode, the power output by said positive and negative twelve volt output means having a magnitude greater than twelve volts by the voltage drop across said connection means connected thereto;

left and right remote sensing means, operatively connected to said positive five volt output means in said left and right power supplies and operatively connectable to the left and right positive five volt power buses, for sensing the voltage carried by the left and right positive five volt power buses, respectively;

a back-up power supply for supplying power to one of the left and right positive five volt power buses, one of the left and right positive twelve volt power buses and one of the left and right negative twelve volt power buses, when a corresponding one of said left and right power supplies fails, said backup power supply comprising:
- back-up five volt output means for maintaining the one of the left and right positive five volt power buses at substantially positive five volts;
- back-up positive twelve volt output means for supplying power to the one of the left and right positive twelve volt power buses; and
- back up negative twelve volt output means for supplying power to the one of the left and right negative twelve volt power buses;

power switching means for supplying power from said left and right power supplies until the corresponding one of the left and right power supplies fails and supplying power from said back up power supply to the one of the left and right power buses when the corresponding one of said left and right power supplies fails; and capacitors operatively connectable to each of the left and right positive five volt, left and right positive twelve volt and the left and right negative twelve volt power buses and to the left and right ground buses.

13. A dual redundant electrical power supply system as recited in claim 12, wherein said power switching means comprises:

left and right relay coils operatively connected to said left and right power supplies, respectively;

first left and right normally open relay contacts operatively connected in series between one of said left and right power supplies and said back-up power supply;

first left and right normally closed relay contacts operatively connected to said left and right remote sensing means, respectively, and said back-up power supply;

first left and right diodes operatively connectable to the left and right positive five volt power buses and operatively connected to said left and right power supplies, respectively;

second left and right diodes operatively connectable to the left and right five volt power buses and operatively connected to the left and right first diodes, respectively, and to said back-up power supply;

second left and right normally open relay contacts operatively connectable to the left and right positive and negative twelve volt power buses and operatively connected to said positive and negative twelve volt output means of said left and right power supplies, respectively; and second left and right normally closed relay contacts operatively connectable to the left and right positive and negative twelve volt power buses and operatively connected to said positive and negative twelve volt output means of said back-up power supply, said left and right relay coils controlling the operation of said first and second, left and right, normally open and normally closed relay contacts.

* * * * *